(12) United States Patent
Kanitz et al.

(10) Patent No.: US 8,289,608 B2
(45) Date of Patent: Oct. 16, 2012

(54) ELECTROCHROMIC FORMULATION, METHOD FOR THE PRODUCTION THEREOF, AND ELECTROCHROMIC ORGANIC COMPONENT

(75) Inventors: Andreas Kanitz, Höchstadt (DE); Wolfgang Roth, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 12/998,247

(22) PCT Filed: Sep. 24, 2009

(86) PCT No.: PCT/EP2009/062370
§ 371 (c)(1),
(2), (4) Date: Mar. 30, 2011

(87) PCT Pub. No.: WO2010/037682
PCT Pub. Date: Apr. 8, 2010

(65) Prior Publication Data
US 2011/0181938 A1 Jul. 28, 2011

(30) Foreign Application Priority Data

Sep. 30, 2008 (DE) .......................... 10 2008 049 546

(51) Int. Cl.
*G02F 1/15* (2006.01)
*G02F 1/00* (2006.01)
(52) U.S. Cl. ......... 359/265; 359/266; 252/583; 252/586
(58) Field of Classification Search .......... 359/265–275; 252/582, 583, 586, 600; 525/417; 528/423
See application file for complete search history.

(56) References Cited

U.S. PATENT DOCUMENTS

| | | | | |
|---|---|---|---|---|
| 4,192,581 A | | 3/1980 | Yaguchi et al. | |
| 4,376,569 A | * | 3/1983 | Barltrop et al. | 359/270 |
| 4,693,564 A | * | 9/1987 | Mori | 359/273 |
| 5,294,376 A | * | 3/1994 | Byker | 252/600 |
| 5,336,448 A | * | 8/1994 | Byker | 252/583 |
| 5,457,564 A | * | 10/1995 | Leventis et al. | 359/271 |
| 5,708,123 A | * | 1/1998 | Johannsen et al. | 528/229 |
| 5,818,636 A | * | 10/1998 | Leventis et al. | 359/273 |
| 6,157,480 A | * | 12/2000 | Anderson et al. | 359/267 |
| 2009/0002802 A1 | | 1/2009 | Shibuya et al. | |
| 2009/0040589 A1 | * | 2/2009 | Kanitz et al. | 359/273 |

FOREIGN PATENT DOCUMENTS

| | | |
|---|---|---|
| DE | 10 2008 049 546.8 | 9/2008 |
| WO | 98/35267 | 8/1998 |
| WO | 2007/006767 | 1/2007 |
| WO | 2008/081541 | 7/2008 |
| WO | PCT/EP2009/062370 | 9/2009 |

OTHER PUBLICATIONS

Michael Felderhoff et al., "Molecular Suppression of the Pimerization of Viologens (=4,4'-Bipyridinium Derivatives) Attached to Nanocrystalline Titanium Dioxide Thin-Film Electrodes," Helvetica Chimica Acta, vol. 83, No. 1, Jan. 24, 2000, pp. 181-192.
Vaibhav Jain et al., "Solid-State Electrochromic Devices via Ionic Self-Assembled Multilayers (ISAM) of a Polyviologen," Marcromolecular Chemistry and Physics, vol. 209, No. 2, Dec. 10, 2007, pp. 150-157.
International Search Report for PCT/EP2009/062370, mailed on Nov. 30, 2009.

* cited by examiner

*Primary Examiner* — Loha Ben
(74) *Attorney, Agent, or Firm* — Staas & Halsey LLP

(57) ABSTRACT

Formulations are used in organically based electrochromic components, e.g. for producing displays and/or state indicators having a longer service life. The service life is increased by end-capping the 4,4'-bipyridinium salt.

7 Claims, No Drawings

ELECTROCHROMIC FORMULATION, METHOD FOR THE PRODUCTION THEREOF, AND ELECTROCHROMIC ORGANIC COMPONENT

CROSS REFERENCE TO RELATED APPLICATIONS

This application is based on and hereby claims priority to International Application No. PCT/EP2009/062370 filed on Sep. 24, 2009 and German Application No. 10 2008 049 546.8 filed on Sep. 30, 2008, the contents of which are hereby incorporated by reference.

BACKGROUND

The invention relates to formulations and the use thereof in organically based electrochromic components.

Electrochromic displays or state indicators based on organic materials normally comprise an active electrochromic layer which, in the case of a display, is located between electrodes disposed vertically with respect to one another. Important constituents of the active layer are a redox system and a dye. The application of a voltage causes the ratio of concentrations of the redox partners with respect to one another to be shifted in the material. In this reaction, protons and/or ions in the material are liberated or bound. When a voltage is applied to the material, the shift of equilibrium of the redox partners present at the two electrodes runs in the reverse direction. This can be made visible for example via a pH-active dye.

A principle for implementing electrochromic displays is to produce the color change not by changing the pH-value in the display but to use the redox processes taking place anyway to produce a high-contrast color change by creating reductive and/or oxidative states in suitable materials. The so-called viologens and polythiophenes have become well known as material classes in this context. German Application Number DE 10 2005 032 316 (published as WO 2007/006767 and U.S. 2009/0040589) discloses polymeric 4,4'-bipyridinium structures separated from one another by an alkene spacer which are eminently suitable for this purpose. Bipyridinium salts produce a violet hue when voltage is applied. These compounds are therefore also termed viologens. This color impression results from so-called "pimerization", a term taken to mean a stacking effect of the molecules because of their structure. If the bipyridinium salts are synthesized as polymers with long spacers, the pimerization is statistically suppressed, so that the radicals formed when voltage is applied appear blue and the reversibility of the switching process becomes more stable.

Although in general the polymeric bipyridyl derivatives of the kind used in the electrochromic formulations already have a very long service life, there is always a need to increase the service life of the formulations still further.

SUMMARY

One potential object is therefore to modify the known formulations based on the 4,4'-bipyridyl compounds mentioned in DE 10 2005 032 316 such that they exhibit increased stability in the electrochromic component.

The inventors propose a dye based on the 4,4'-bipyridinium salts for a formulation for an electrochromically active organic electronic component, wherein at least one reactive terminal group of the 4,4'-bipyridinium salt is replaced or protected by at least one inert terminal group. The inventors also propose an electrochromic organic component containing the electrochromically active formulation.

Endcapping is the replacement or protection of a reactive terminal group by an inert and non-reactive terminal group with the aim of ensuring that the compound can no longer attack the material of the surrounding layers. The reactive terminal group can both be eliminated and deactivated by conversion.

According to an advantageous embodiment, the formulation also comprises a stabilizing agent in the form of a metal (II) complex such as a metallocene, e.g. a ferrocene or a ferrocene derivative.

According to an advantageous embodiment, the inert terminal group comprises an inert N-substituted alkyl group.

According to an advantageous embodiment, the formulation comprises a whitening agent or a white pigment.

Alkoxy groups and/or N-substituted alkyl or aryl groups, for example, are possible as an inert terminal group.

For example, all the known alkyl, aryl residues, carboxylic acid ester residues and/or ethers are used as inert terminal groups. These are produced e.g. during etherification with alcohols. Alcohols for introducing relevant groups by etherification and other terminal groups are possible which are ultimately chemically unreactive and/or little polarized.

The particular aim of endcapping is to ensure that the electrochromic formulation in the form of a paste, as present in the electrochromic cell, behaves in an inert, unreactive and therefore unaggressive or non-damaging manner with respect to other materials, particularly to the transparent electrode such as the indium tin oxide (ITO) electrode of the electrochromic component.

For the preparation, reference is made to the synthesis, as described in U.S. 2009/0040589, of a nonpimerizing polymeric bipyridyl derivative (poly-N,N'-dodecylene-4,4'-dipyridyl) according to the standard method disclosed there, which is hereby incorporated herein by reference. This is followed—likewise via chemical synthesis—by endcapping, by which is meant the stabilization of the material by inserting at least one inert terminal group.

DETAILED DESCRIPTION OF THE PREFERRED EMBODIMENT

Reference will now be made in detail to the preferred embodiments of the present invention, examples of which are illustrated below.

On the basis of poly-N,N'-dodecylene-4,4'-dipyridyl, endcapping is performed e.g. as follows:

The suspension of 3 g poly-N,N'-dodecylene-4,4'-dipyridyl and 150 ml n-butylamine (b.p. 100-104° C.) is refluxed for 2 hours. After extraction by suction, the material is washed with ether and oven-dried. The light yellow powder is used to prepare an electrochromically active formulation.

Preparation of the Electrochromically Active Formulation 6 g titanium dioxide is mixed with 0.6 g endcapping-improved poly-N,N'-dodecylene-4,4'-dipyridyl prepared in the manner described above and 0.23 g ferrocene using a speed mixer. The mixture obtained is dispersed in 2.2 g diethylene glycol, likewise using a speed mixer.

Preparation of An Electrochromically Active Cell

The white formulation obtained is applied by doctor blade to a lower electrode layer on a substrate, such as an ITO-coated PET film, an adhesive frame being used to delimit the electrochromically active surface. The adhesive frame is also used for bonding to the upper electrode layer, e.g. a second ITO-coated film as the counter-electrode. When the cell is connected, a blue color impression is obtained at the electrode.

Service Life Measurement

The service life measurement is performed at a temperature of 85° C. The service life is 3219 hours and is therefore 749 hours or approx. 30% higher than the service life of a cell with untreated poly-N,N'-dodecylene-4,4'-dipyridyl, the service life being defined as the decrease in the initial contrast to 20%.

The introduction of inert terminal groups is accompanied by the elimination of the existing reactive terminal groups such as e.g. residual covalently bound bromine terminal groups which are present as a result of the synthesis. The elimination takes place with suitable reagents which vary according to the terminal group to be eliminated and are readily accessible to a person skilled in the art. The content of the terminal groups varies, so that it cannot be fixed in a reproducible manner. A bromine content of the bipyridyl derivative dependent on the particular batch is therefore anticipated.

In untreated poly-N,N'-dodecylene-4,4'-dipyridyl, for example, the covalently bound bromine may be split off particularly at elevated temperature in the electrochromic component in successive reactions and may therefore, in the absence of endcapping, attack the electrode, thereby preventing the further electrical connection of the component. As a result of this effect, the service life of an electrochromically active cell is limited. If the material is improved by endcapping of the 4,4' bipyridinium salt, the service life of the component is increased e.g. by some 30%.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An electrochromically active dye comprising:
   a 4,4'-bipyridinium salt having at least two reactive terminal groups, at least one of the reactive terminal groups being replaced or protected by an inert terminal group.

2. The electrochromically active dye as claimed in claim 1, wherein the 4,4'-bipyridinium salt is poly-N,N'-dodecylene-4,4'-dipyridyl.

3. The electrochromically active dye as claimed in claim 1, wherein the inert terminal group is at least one of an alkoxy group, an N-substituted alkyl group and an N-substituted aryl group.

4. A formulation comprising:
   an electrochromically active dye formed from a 4,4'-bipyridinium salt having at least two reactive terminal groups, with at least one of the reactive terminal groups being replaced or protected by an inert terminal group; and
   a white pigment and/or a metallocene as a stabilizing agent.

5. The formulation as claimed in claim 4, wherein the inert terminal group is at least one of an alkoxy group, an N-substituted alkyl group and an N-substituted aryl group.

6. An electrochromic organic component comprising:
   at least two electrodes; and
   a formulation sandwiched between the electrodes, the formulation comprising:
   an electrochromically active dye formed from a 4,4'-bipyridinium salt having at least two reactive terminal groups, with at least one of the reactive terminal groups being replaced or protected by an inert terminal group; and
   a white pigment and/or a metallocene as a stabilizing agent.

7. The electrochromic organic component as claimed in claim 6, wherein the inert terminal group is at least one of an alkoxy group, an N-substituted alkyl group and an N-substituted aryl group.

* * * * *